Patented Sept. 27, 1932

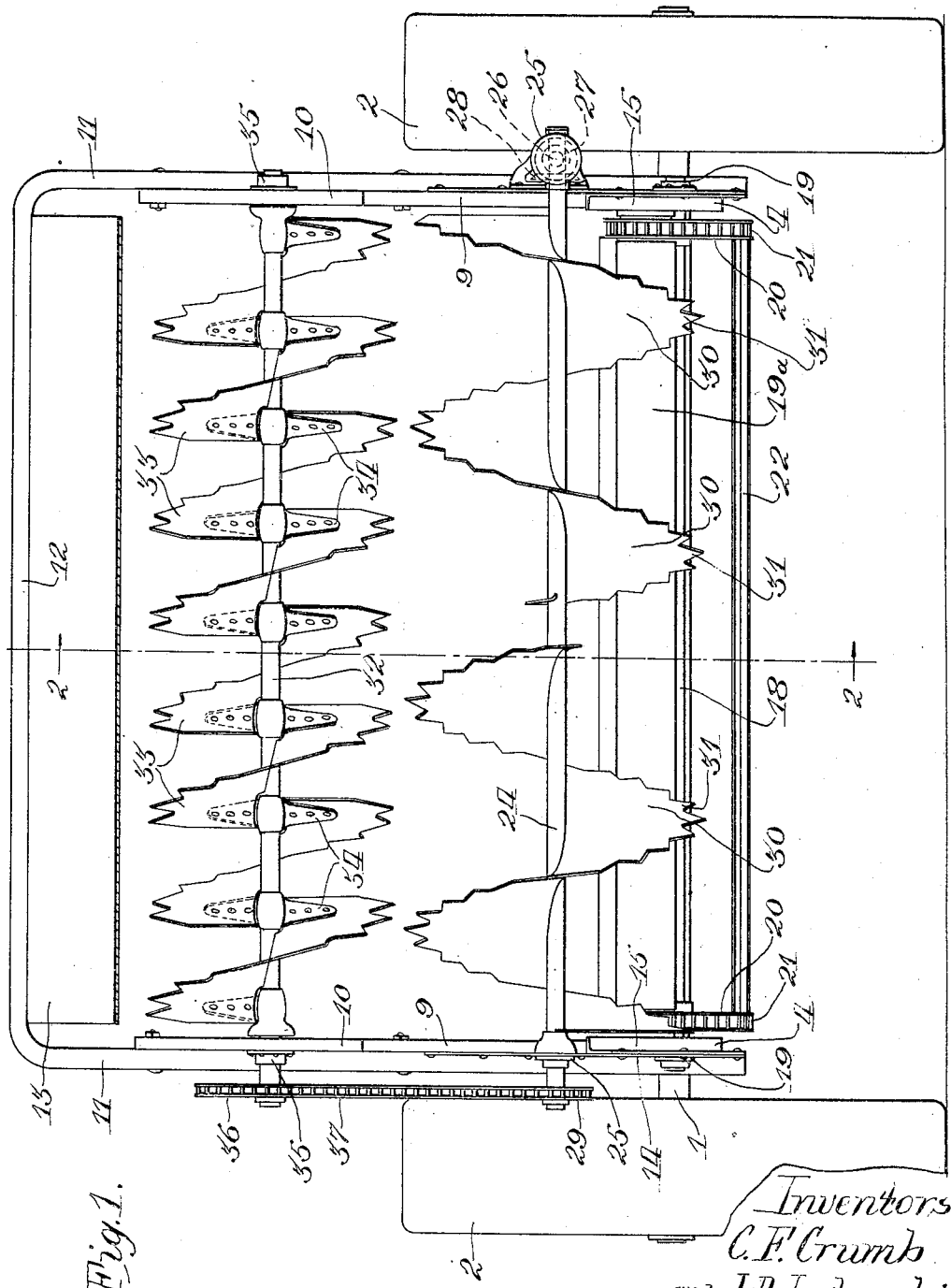

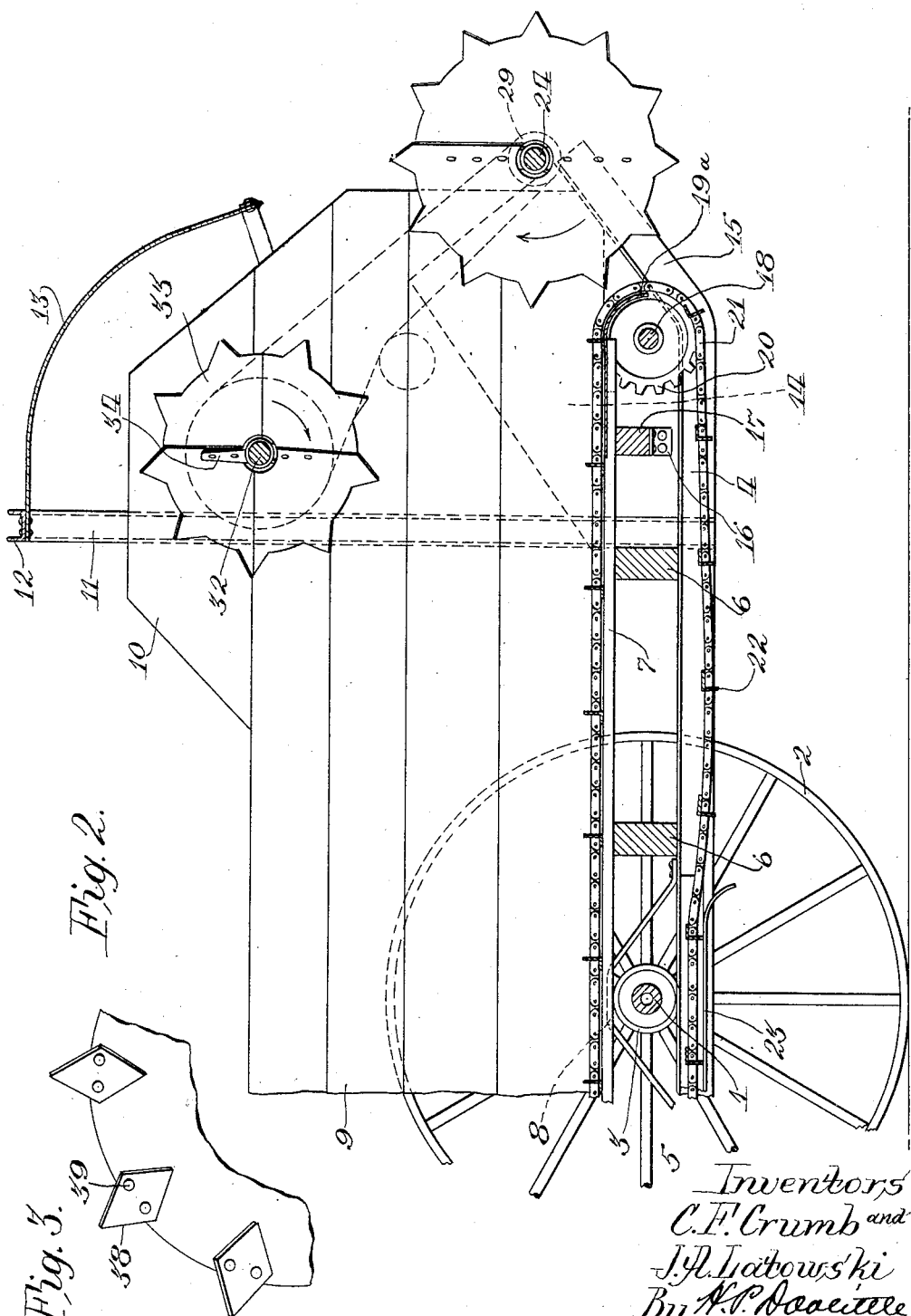

1,879,114

UNITED STATES PATENT OFFICE

CHARLES F. CRUMB, OF CHICAGO, AND JOHN A. LATOWSKI, OF HARVEY, ILLINOIS, ASSIGNORS TO INTERNATIONAL HARVESTER COMPANY, A CORPORATION OF NEW JERSEY

MANURE SPREADER

Application filed May 12, 1930. Serial No. 451,580.

This invention relates to a manure spreader. More particularly it relates to a spreader particularly adaptable for power operation.

The object of the invention is to provide an improved and simplified wide distributing type of manure spreader.

A more particular object is to minimize the rotating elements used for feeding and distributing the material from the spreader body.

Other objects will be apparent from the detailed description to follow.

In the drawings:

Figure 1 is a rear end view of a spreader embodying the invention;

Figure 2 is a longitudinal section taken on the lines 2—2 of Figure 1, only the rear end of the spreader being shown, as such a view shows all of the elements necessary to illustrate the invention; and Figure 3 is an enlarged detail of a portion of one of the beater spirals showing a preferred type of detachable reversible teeth.

The spreader body is supported at the rear on an axle 1 extending underneath the bottom of the body. The wheels 2 on the axle are free running, as the particular spreader illustrated is adapted to be driven by power transmitted to the spreader from a tractor.

Bearing boxes 3 are mounted at each end of the axle adjacent the wheels. Horizontally extending angle bars 4 forming the side members of the main frame of the spreader are secured to the underneath side of the bearing boxes. Strap irons 5 attached to the angle bars at each side of the bearing boxes 3 extend over the top of the boxes as braces and additional means of support.

A series of cross sills 6 arranged at spaced intervals on the angle bars 4 support the bottom of the spreader body. The bottom of the spreader is composed of longitudinally extending boards 7. The sills 6 are of sufficient width to allow the boards 7 to clear the bearing boxes 3. A groove 8 is cut in the board 7 at each side of the bottom to fit over the strap iron 5, in order to allow the bottom to be built as low down as possible. The sides of the spreader body are made up of boards 9 in a conventional manner. Side boards 10 are mounted at the rear of the spreader body to obtain additional height. A channel bar arch ending over the spreader body has vertical portions 11 extending above the side boards 10, and a horizontal portion 12. A shield 13 is attached to the horizontal portion 12 of the arch and extends rearwardly downward in a curved manner.

Metal plates 14 are secured at the rear ends of the body sides to upwardly directed extensions 15 of the side frame bars 4 and to the lower ends of the vertical portions 11 of the channel bar arch. Small brackets 16 attached to the plates 14 support the rear bottom sill 17. A shaft 18 is mounted in bearings 19 secured to the plates 15 between the bottom of the spreader body and the frame angle bars 4. Longitudinally of the spreader body the shaft is positioned adjacent the upward bend in said angle bars. The bottom boards 7 terminate vertically above the shaft 18. An extension 19[a] secured to the end of the bottom boards curves downwardly about the center of the shaft 18 as an axis. Chain sprockets 20 are mounted at each end of the shaft 18 inside the spreader body. The sprockets are of such a diameter that the periphery is substantially tangent with the upper surface of the floor boards 7.

An endless drag apron, consisting of chains 21 and drag links 22 attached at spaced intervals to the chains, is positioned along the bottom boards 7 and around the sprockets 20. At the front end of the spreader body similar chain sprockets, not shown, are provided for supporting the apron at that point. A support 23 is positioned under the rear axle to guide the apron and prevent sagging to an undesirable extent.

A wide spread beater is mounted at the rear of the spreader body on a shaft 24. The shaft 24 is mounted in bearing brackets 25 which are rigidly secured to the plates 14. At one end the bracket 25 is constructed to receive a longitudinally extending drive shaft 26. The drive shaft 26 carries a bevel gear 27 which meshes with a bevel gear 28 on the shaft 24. At the other side of the spreader body, the shaft 24 carries a chain sprocket 29 for a purpose to be hereinafter described.

Two wide spread spirals 30 are connected to the shaft 24 by suitable means, not shown in detail, and are wound outwardly from the center thereof in opposite, angular directions. The spirals are provided with a series of spaced, pointed teeth 31. The shaft 24 is mounted rearwardly of the apron shaft 18 and vertically above said shaft. The radii of the spirals 30 and the relative locations of the shafts 24 and 18 are such that the paths taken by the points of the teeth 31 extend into the plane of the apron or bottom of the body and pass as close to the apron drag links 22 as practicable.

A second beater member is mounted at the top of the spreader body forwardly from the wide spread beater. The second beater member consists of a shaft 32 on which a series of spirally formed toothed blades or elements 33 are secured by means of brackets 34. Each of the elements 33 are sections of a spiral approximately 360 degrees angular distance and are pitched in the same direction.

The shaft 32 is mounted in bearings 35 which are suitably attached to the sides of the spreader body. A chain sprocket 36 on a lateral extension of the shaft 32 is positioned in alignment with the sprocket 29 on the shaft 24. A chain 37 joins the sprockets and forms means for driving the upper beater member. The two beaters are thus located on transverse vertical planes offset longitudinally of the body. In Figure 3 an enlarged view is shown of a preferred type of removable teeth for the spirals 30 and 33. The teeth 39 are diamond shaped with a pair of holes being provided on one diagonal near the corners by means of which the teeth are attached with rivets 38 to the spirals. When one end of a tooth becomes worn it may be reversed. This construction doubles the life of the teeth.

In the operation of this device, the spreader is drawn forwardly by a tractor, which also furnishes power through a take-off shaft to the shaft 26 for driving the moving parts of the spreader. The particular mechanism for transmitting power to the shaft 24 is not shown as it is not a part of the present invention. The shaft 26 and the gears 27 and 28 illustrate the final drive of a mechanism which can be operated from a tractor power take-off shaft. Any other means shown in the prior art would serve equally well for driving the shaft 24 of the lower beater and the shaft 32 of the upper beater through the chain 37. The apron is driven in any conventional manner, such as by ratchet type mechanisms in wide use. The wide spread beater is rotated in the direction indicated by the arrow in Figure 2, that is with the teeth adjacent the load or the end of the spreader rotating upwardly.

The apron moves the material in the spreader body rearwardly against the spirals 30. As the spirals wind outwardly from the center, it will be understood that the material engaged by the teeth 31 will be thrown laterally, as well as upwardly and rearwardly.

The upper beater member at the top of the spreader body acts as a retarding and disintegrating device to prevent too great a volume of material from being delivered to the wide spread beater at too high a level and in an unbroken mass. The material that the upper member engages and throws over will be deflected by the shield 13 downwardly against the spirals 30, whereby such material will be distributed in the proper manner.

It will be understood that, although applicants have illustrated and described a preferred embodiment of their improved device, it is their intention to limit their invention only by the scope of the appended claims.

What is claimed is:

1. In a manure spreader, a load carrying body, means for delivering material in said body rearwardly, a wide spread spiral beater mounted at the rear of said body adjacent the bottom of the body whereby the material in the body is delivered directly thereagainst, a second spiral beater mounted forwardly of the wide spread beater and vertically thereabove, and means for driving the beaters with the adjacent portions of the respective beaters moving in opposite directions.

2. In a manure spreader, a load carrying body, means for delivering the load rearwardly, a wide spread laterally distributing beater mounted at the rear end of said body with the lower portion of the beater extending into the plane of the bottom of the body, means for rotating said beater with the portion adjacent the load moving upwardly whereby the material of the load is thrown rearwardly and laterally, an upper retarding beater rotatably mounted at the top of the spreader body and forwardly from the wide spread beater, means for rotating said beater with the lower portion moving toward the load, and a shield mounted above the retarding beater and extending rearwardly downward therefrom whereby any material thrown over the retarding beater is deflected downwardly onto the wide spread beater.

3. In a manure spreader, a load carrying body, upper and lower beaters occupying the rear end of said body, each of said beaters consisting of toothed spiral blades and the upper beater being located forwardly of the lower beater with the upper side of the lower beater and the lower side of the upper beater lying in substantially the same horizontal plane, and means for driving said beaters in the same angular direction whereby the adjacent portions of the beaters move in opposite directions.

In testimony whereof we affix our signatures.

CHARLES F. CRUMB.
JOHN A. LATOWSKI.